United States Patent
Chiu

(10) Patent No.: US 9,148,275 B2
(45) Date of Patent: *Sep. 29, 2015

(54) UNIFIED, PROGRAMMABLE RECEIVER WITH SUPPORT FOR MULTIPLE MODES

(71) Applicant: Broadcom Corporation, Irvine, CA (US)

(72) Inventor: Fu-Hsuan Chiu, Berkeley Heights, NJ (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/187,760

(22) Filed: Feb. 24, 2014

(65) Prior Publication Data

US 2014/0169511 A1    Jun. 19, 2014

Related U.S. Application Data

(63) Continuation of application No. 13/657,438, filed on Oct. 22, 2012, now Pat. No. 8,699,612.

(51) Int. Cl.
| | |
|---|---|
| *H04L 1/02* | (2006.01) |
| *H04L 7/00* | (2006.01) |
| *H04B 7/08* | (2006.01) |
| *H04L 25/02* | (2006.01) |
| *H04B 7/04* | (2006.01) |

(52) U.S. Cl.
CPC ............... *H04L 7/0079* (2013.01); *H04B 7/08* (2013.01); *H04B 7/0894* (2013.01); *H04L 25/0204* (2013.01); *H04L 25/0206* (2013.01); *H04L 25/0228* (2013.01); *H04B 7/0413* (2013.01); *H04B 7/0871* (2013.01)

(58) Field of Classification Search
CPC .............. H04L 7/0079; H04L 25/0204; H04L 25/0228; H04L 25/0206; H04L 27/26; H04B 7/08; H04B 7/0894; H04B 7/0871; H04B 7/0413
USPC .......................... 375/347, 340, 343, 346, 350
See application file for complete search history.

(56) References Cited

U.S. PATENT DOCUMENTS

| | | | |
|---|---|---|---|
| 8,699,612 B1 | 4/2014 | Chiu | |
| 2003/0128780 A1 | 7/2003 | Okamoto | |
| 2012/0321004 A1 | 12/2012 | Soul et al. | |
| 2013/0170590 A1* | 7/2013 | Hyll et al. | ...................... 375/343 |
| 2014/0112377 A1 | 4/2014 | Chiu | |

OTHER PUBLICATIONS

"3rd Generation Partnership Project; Technical Specification Group Radio Access Network; High Speed Packet Access (HSDPA) multipoint transmission (Release 11)", 3GPP Organizational Partners, 3GPP TR 25.872, vol. 11.0.0, Sep. 2011, pp. 1-29 pages.

* cited by examiner

Primary Examiner — Dhaval Patel
(74) Attorney, Agent, or Firm — Fiala & Weaver P.L.L.C.

(57) ABSTRACT

Techniques are described herein that receive communications transmitted according to different operation modes at a multi-mode, programmable receiver system. The multi-mode, programmable receiver system may receive communication signals from transmit antennas in "cells" (e.g., base station transceivers and/or the like) according to one or more operation modes, using receive antennas. The received signals may be converted and processed by various modules of the multi-mode, programmable receiver system to produce an output signal. The multi-mode, programmable receiver system includes modules that are programmable to be selectively enabled or disabled according to an operation mode in accordance with which the multi-mode, programmable receiver system operates.

20 Claims, 7 Drawing Sheets

UNIFIED, PROGRAMMABLE RECEIVER WITH SUPPORT FOR MULTIPLE MODES

CROSS-REFERENCE TO RELATED APPLICATION(S)

This application claims the benefit of co-pending U.S. patent application Ser. No. 13/657,438, entitled "Unified, Programmable Receiver with Support for Multiple Modes," filed Oct. 22, 2012, which is hereby incorporated herein by reference in its entirety and made part of this application for all purposes.

BACKGROUND

Communication systems (e.g., telecommunication systems) may operate in accordance with any of a variety of communication protocols, such as a $3^{rd}$ Generation Partnership Protocol (3GPP), for example, Wideband Code Division Multiple Access (WCDMA) and/or High-Speed Downlink Packet Access (HSDPA). Conventional communication devices that are used in such communication systems are typically configured to operate in a mode that is in accordance with a particular one of the communication protocols. Examples of a communication device include but are not limited to a mobile device (e.g., a personal digital assistant (PDA), a cellular telephone, a tablet computer, a laptop computer, etc.), a desktop computer, and the like.

Each conventional communication device includes a receiver system, which is capable of receiving signals in accordance with particular communication protocols with which the communication device is configured to operate. A receiver system in a conventional communication system may operate in one of a variety of operation modes. Examples of an operation mode include but are not limited to a multi-point high-speed downlink packet access (MP-HSDPA) mode, a Type3 mode, a Type3I mode, a multiple-input/multiple-output (MIMO) mode, and a space time transmit diversity (STTD) mode. A receiver system that operates in a Type3 mode has receive diversity and is not interference-aware. A receiver system that operates in a Type3I mode has receive diversity and is interference-aware. It is noted that a receiver system may be a transceiver system, which is capable of receiving and transmitting signals in accordance with the particular communication protocol and operation mode.

BRIEF SUMMARY

A system and/or method for receiving communications (e.g., signals) transmitted according to different communication protocols at a unified receiver programmable to operate in multiple modes, substantially as shown in and/or described in connection with at least one of the figures, as set forth more completely in the claims.

BRIEF DESCRIPTION OF THE DRAWINGS/FIGURES

The accompanying drawings, which are incorporated herein and form part of the specification, illustrate embodiments of the disclosed technologies and, together with the description, further serve to explain the principles involved and to enable a person skilled in the relevant art(s) to make and use the disclosed technologies.

Figure 1A:
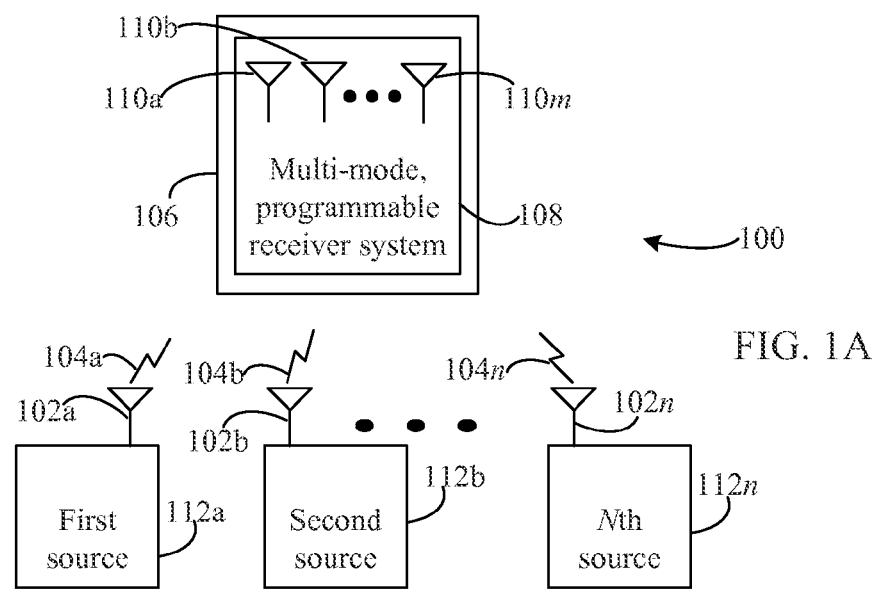
FIG. 1A is a block diagram of an example communication system in accordance with an embodiment described herein.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate example embodiments of the disclosed technologies. However, the scope of the disclosed technologies is not limited to these embodiments, but is instead defined by the appended claims. Thus, embodiments beyond those shown in the accompanying drawings, such as modified versions of the illustrated embodiments, may nevertheless be encompassed by the disclosed technologies.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Various approaches are described herein for, among other things, receiving communications transmitted to a multi-mode, programmable receiver system according to different operation modes (e.g., a multi-point high-speed downlink packet access (MP-HSDPA) mode, a Type3 mode, a Type3I mode, a multiple-input/multiple-output (MIMO) mode, and a space time transmit diversity (STTD) mode, etc.). The multi-mode, programmable receiver system may be included in a communication device (e.g., a mobile device, such as (PDA), a cellular telephone, a tablet computer, a laptop computer, etc.). The multi-mode, programmable receiver system may include programmable modules (e.g., circuit modules, software modules, firmware modules, or any combination thereof) that are programmable to be selectively enabled or disabled according to an operation mode in accordance with which the multi-mode, programmable receiver system operates. The multi-mode, programmable receiver system may receive communication signals from one or more "cells" (e.g., base station transceivers, radio network controllers, and/or the like) according to one or more operation modes, using one or more receive antennas. The received signals may be converted and processed by the various modules of the multi-mode, programmable receiver system or a subset thereof to produce an output signal, for example, which may be processed by other components of the communication device.

An example system is described that includes a first channel estimation block, a second channel block, a closed-loop frequency offset compensator, an open-loop frequency offset compensator, and a timing compensator. The first channel estimation block is configured to perform a first channel estimation with regard to a first channel between a first transmit antenna and a first receive antenna and a second channel estimation with regard to a second channel between the first transmit antenna and a second receive antenna using a first scrambling code and a first common pilot channel pattern that are associated with the first transmit antenna. The second channel estimation block is configured to perform a third channel estimation with regard to a third channel between a second transmit antenna and the first receive antenna and a fourth channel estimation with regard to a fourth channel between the second transmit antenna and the second receive antenna using a second scrambling code and a second common pilot channel pattern that are associated with the second transmit antenna. The closed-loop frequency offset compensator is configured to compensate for a first frequency offset that is equal to a difference between a first carrier frequency associated with the first transmit antenna and a frequency synthesized by a local crystal oscillator. The open-loop frequency offset compensator is configured to compensate for a second frequency offset that is equal to a difference between the first carrier frequency and a second carrier frequency associated with the second transmit antenna by adjusting at least one of a phase associated with the third channel estimation or a phase associated with the fourth channel estimation. The timing compensator is configured to compensate for a sampling timing difference between a first sampling timing that is associated with the first transmit antenna and a second sampling timing that is associated with the second transmit antenna. At least the open-loop frequency offset compensator and/or the timing compensator is programmable to be selectively enabled or disabled based on a specified operation mode, which is selected from a plurality of operation modes, in accordance with which the multi-mode, programmable receiver system is to operate.

An example method is also disclosed. The example method is performed by a receiver system that is configurable to operate in accordance with each of a plurality of operation modes. The method includes performing a first channel estimation operation to determine a first channel estimation with regard to a first channel between a first transmit antenna and a first receive antenna and a second channel estimation operation to determine a second channel estimation with regard to a second channel between the first transmit antenna and a second receive antenna using a first scrambling code and a first common pilot channel pattern that are associated with the first transmit antenna. The method also includes compensating for a first frequency offset that is equal to a difference between a first carrier frequency associated with the first transmit antenna and a frequency synthesized by a local crystal oscillator. A subset (e.g., none, one or more, or all) of a plurality of operations is selected to be performed based on a specified operation mode of the plurality of operation modes in accordance with which the receiver system is configured to operate. The plurality of operations includes compensating for a second frequency offset that is equal to a difference between the first carrier frequency and a second carrier frequency associated with a second transmit antenna by adjusting a phase associated with a third channel estimation regarding a third channel between the second transmit antenna and the first receive antenna and/or a phase associated with a fourth channel estimation regarding a fourth channel between the second transmit antenna and the second receive antenna. The plurality of operations also includes compensating for a sampling timing difference between a first sampling timing that is associated with the first transmit antenna and a second sampling timing that is associated with the second transmit antenna. If the selected subset includes at least one operation of the plurality of operations, the method may further include performing the selected subset of operations.

Another example system is described. The system includes a first converter, a second converter, a first channel estimator, a second channel estimator, a third channel estimator, a fourth channel estimator, a first frequency offset estimator, a second frequency offset estimator, a closed-loop frequency offset compensator, a signal controller, a first delay locked loop, a second delay locked loop, a down-sampling controller, a first delay matched module, a second delay matched module, an open-loop frequency offset compensator, a timing compensator, and an equalizer. The first converter is configured to convert a first instance of one or more radio frequency signals received from one or more respective transmit antennas via a first receive antenna to a first baseband signal. The second converter is configured to convert a second instance of one or more radio frequency signals via a second receive antenna to a second baseband signal. The first channel estimator is configured to perform a first channel estimation with regard to a first channel between a first transmit antenna of the plurality of transmit antennas and the first receive antenna based on samples from a sampled representation of the first baseband signal using a first scrambling code and a first common pilot channel pattern that are associated with the first transmit antenna. The second channel estimator is configured to perform a second channel estimation with regard to a second channel between the first transmit antenna and the second receive antenna based on samples from a sampled representation of the second baseband signal using the first scrambling code and the first common pilot channel pattern. The third channel estimator is configured to perform a third channel estimation with regard to a third channel between a second transmit antenna of the one or more transmit antennas and the first receive antenna based on samples from the sampled representation of the first baseband signal using a second scrambling code and a second common pilot channel pattern that are associated with the second transmit antenna. The fourth channel estimator is configured to perform a fourth channel estimation with regard to a fourth channel between the second transmit antenna and the second receive antenna based on samples from the sampled representation of the second baseband signal using the second scrambling code and the second common pilot channel pattern. The first frequency offset estimator is configured to determine a first frequency offset, the first frequency offset indicating a difference between a first carrier frequency associated with the first transmit antenna and a frequency synthesized by a local crystal oscillator. The second frequency offset estimator is configured to determine a second frequency offset, the second frequency offset indicating a difference between the first carrier frequency and a second carrier frequency associated with the second transmit antenna. The closed-loop frequency offset compensator is configured to compensate for the first frequency offset and a signal controller. The first delay locked loop is configured to reduce timing drift associated with the sampled representation of the first baseband signal. The second delay locked loop is configured to reduce timing drift associated with the sampled representation of the second baseband signal. The down-sampling controller is configured to reduce an oversampling rate associated with the first baseband signal and the second baseband signal to provide a first two-times chip-rate sampling frequency representation of the first baseband signal and a second two-times chip-rate sampling frequency representation of the second baseband signal. The first delay matched module is configured to delay the first two-times chip-rate sampling frequency representation to compensate for a first delay associated with the first channel estimator to provide a first time adjusted signal. The second delay matched module is configured to delay the second two-times chip-rate sampling frequency representation to compensate for a second delay associated with the second channel estimator to provide a second time adjusted signal. The open-loop frequency offset compensator is configured to compensate for the difference between the first carrier frequency and the second carrier frequency by adjusting at least one of a phase associated with the third channel estimation or a phase associated with the fourth channel estimation. The timing compensator is configured to compensate for a sampling timing difference between a first sampling timing that is associated with the first transmit antenna and a second sampling timing that is associated with the second transmit antenna. The equalizer is configured to process the first two-times chip-rate sampling frequency representation and the second two-times chip-rate sampling frequency representation using the first channel estimation, the second channel estimation, the third channel estimation, and the fourth channel estimation to provide an output signal. In the system, one or more of the third channel estimator, the fourth channel estimator, the second frequency offset estimator, the open-loop frequency offset compensator, and the timing compensator are programmable to be selectively enabled or disabled based on a specified operation mode, which is selected from a plurality of operation modes, in accordance with which the receiver system is to operate.

The multi-mode, programmable receiver system and techniques described herein have a variety of benefits as compared to conventional techniques for receiving a communication signal. For instance, the techniques described herein may allow for compatibility between new and established operation modes in a unified (e.g., single) device. The techniques may allow a communication device to be programmably configured to operate in accordance with any one or more of these operation modes. The techniques may thus allow for increased flexibility of use while simultaneous adhering to the technical requirements of the various operation modes. The techniques may also allow for operation of communication devices within communication systems that employ multiple transmitting antennas as well as single, or multiple, cells. For example, the techniques may allow for a unified receiver system to fully support a Type3I mode while allowing for full compatibility with the MP-HSDPA mode for increased cell-edge throughput.

II. Example Communication System Embodiments

FIG. 1A is a block diagram of an example communication system 100 (e.g., a telecommunication system) in accordance with an embodiment described herein. Generally speaking, communication system 100 may be a communication system that operates to provide voice and/or data communications to communication device(s) in accordance with one or more operation modes (e.g., MP-HSDPA, Type3I, MIMO, STTD, Type3, etc.). In accordance with example embodiments, communication system 100 is configured to provide voice and/or data communications to such communication device(s) from one or multiple transmit antennas based on one or more of the operation modes described herein. Operation modes may be carried out using chip and/or symbol equalization, depending upon parameters associated with a given operation mode.

Generally speaking, communication systems (e.g., communication system 100) described herein may operate according to one or more operation modes. For example, MP-HSDPA modes operate by having a first source (e.g., a serving cell such as a base station transceiver, a radio network controller and/or the like, such as first source 112a) and a second source (e.g., a multi-point serving cell such as a base station transceiver, a radio network controller and/or the like, such as one of second source 112b through Nth source 112n), which provide information (e.g., data) to a communication device (e.g., communication device 106 described below) using radio frequency signals (e.g., radio frequency signals 104a-104n described below) transmitted by transmit antennas (e.g., transmit antennas 102a-102n). Transmit antennas (e.g., transmit antennas 102a-102n) may be communicatively coupled to the sources (e.g., sources 112a-112n. A receiver (e.g., multi-mode, programmable receiver system 108 described below) in such a communication system may receive the radio frequency signals using receive antennas (e.g., receive antennas 110a-110m described below). The receiver may process and align the received radio frequency signals. The receiver may account for correlation and/or covariance of the received radio frequency signals in order to properly decode the signals.

Type3I modes, in contrast, operate using one source (e.g., a serving cell) to provide information to a communication device. In Type3I modes, however, a second source (e.g., an interfering cell such as a base station transceiver, a radio network controller and/or the like) may also transmit radio frequency signals that are received by the communication device. A receiver operating in a Type3I mode may monitor the radio frequency signals that are received from the interfering cell (i.e., be aware of the interfering cell) and suppress interference (e.g., monitor the covariance of the interfering cell with respect to the serving cell) in order to decode the radio frequency signals that are received from the serving cell in an accurate manner. In Type3I modes, the covariance portion of the radio frequency signals received from the interfering cell may be monitored and not fully processed and/or decoded.

MIMO and STTD modes operate using one source (e.g., a serving cell) with multiple transmit antennas to provide information to a communication device. Accordingly, in MIMO and STTD modes, the receiver need not necessarily account for timing offsets and misalignments.

Type3 modes operate using a single source (e.g., a serving cell) with a single transmit antenna to provide information to a communication device. Type3 modes are not interference-aware, and processing for correlation between multiple sources need not be performed.

As shown in FIG. 1A, communication system 100 includes a plurality of transmit antennas 102a-102n and a communication device 106. Transmit antennas 102a-102n may be communicatively coupled to one or more sources. For example, one or more of the transmit antennas 102a-102n may be communicatively coupled to a common source (e.g., one of sources 112a-112n, as exemplified in FIG. 1C below). In another example, subsets of the transmit antennas 102a-102n may be communicatively coupled to respective sources (e.g., sources 112a-112n, respectively). Examples of a source include but are not limited to a base station transceiver, a radio network controller, etc.

Each of source(s) 112a-112n may be configured as a serving cell, a multi-point serving cell (i.e., a MP-HSDPA serving cell), or an interfering cell. Transmit antennas 102a-102n transmit respective radio frequency signals 104a-104n. Each of the radio frequency signals 104a-104n may include data, voice communications, and/or communication system-related information at a respective carrier frequency. Radio frequency signals 104a-104n may be transmitted via respective channels (e.g., channels 114a-114d as described below with respect to FIG. 1B and FIG. 1C) from the respective transmit antennas 102a-102n to communication device 106. Any one or more of the channels in the communication system 100 may include multiple paths. For instance, code division multiple access (CDMA) communication systems are multi-path systems and may transmit voice and/or data information via multiple paths of a channel.

Transmit antennas 102a-102n are configured to transmit respective radio frequency signals 104a-104n to communication device 106. Communication device 106 may be a mobile device, such as a personal digital assistant (PDA), a cellular telephone, a tablet computer, a laptop, and/or the like in one or more embodiments. Communication device 106 includes a multi-mode, programmable receiver system 108. Multi-mode, programmable receiver system 108 is configured to receive and process the radio frequency signals 104a-104n in accordance with one or more operation modes via at least one antenna of a plurality of receive antennas 110a-110m. While not shown, communication system 100 may include a plurality of communication devices 106 in some embodiments.

Figure 1B:
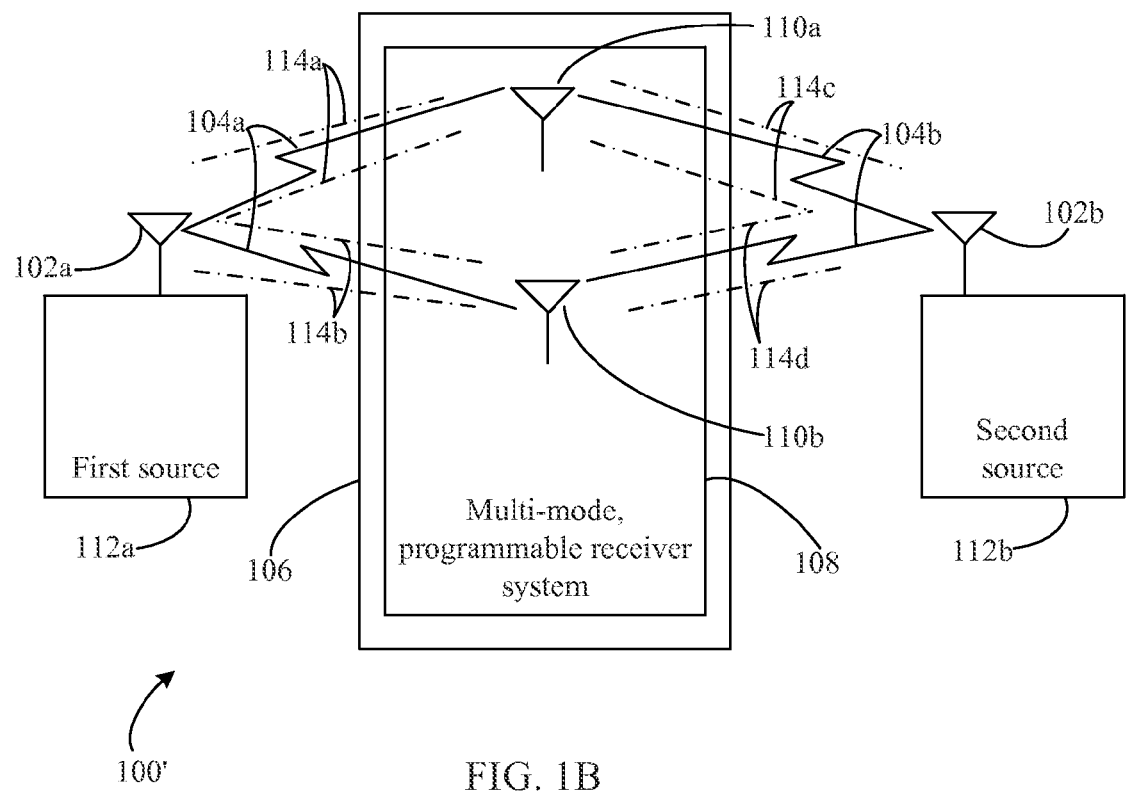
FIGS. 1B-1C are block diagrams of example implementations of a communication system shown in FIG. 1A in accordance with embodiments described herein.

FIG. 1B is a block diagram of a communication system 100', which is an example implementation of a communication system 100 shown in FIG. 1A, in accordance with an embodiment described herein. Generally speaking, communication system 100' operates to provide voice and/or data communications to communication device(s) in accordance with one or more communication protocols. In accordance with example embodiments, communication system 100' is configured to provide voice and/or data communications to such communication device(s) (e.g., communication device 106) via channels (e.g., channels 114a-114d) from multiple transmit antennas (e.g., transmit antennas 102a and 102b) based on one or more of the communication protocols described herein.

As shown in FIG. 1B, communication system 100' includes two transmit antennas 102a-102b and communication device 106. It is contemplated, however, that in accordance with some embodiments, additional (or fewer) transmit antennas (e.g., transmit antennas 102a-102n as shown in FIG. 1A) and additional communication devices 106 may be included in communication system 100'. First transmit antenna 102a is communicatively coupled to a serving cell (e.g., first source 112a), and second transmit antenna 102b is communicatively coupled to a multi-point serving cell or an interfering cell (e.g., second source 112b). It is contemplated that first source 112a and second source 112b may be configured as any combination of serving cell(s), multi-point serving cell(s), and/or interfering cell(s) in various embodiments. First transmit antenna 102a and second transmit antenna 102b transmit radio frequency signals 104a and 104b, respectively.

Radio frequency signal 104a is transmitted via channels 114a and 114b, and radio frequency signal 104b is transmitted via channels 114c and 114d. For example, a first instance of radio frequency signal 104a may be transmitted via channel 114a, and a second instance of radio frequency signal 104a may be transmitted via channel 114b. In accordance with this example, a first instance of radio frequency signal 104b may be transmitted via channel 114c, and a second instance of radio frequency signal 104b may be transmitted via channel 114d.

Multi-mode, programmable receiver system 108 includes two receive antennas 110a and 110b for illustrative purposes and is not intended to be limiting. Receive antennas 110a and 110b are configured to receive the radio frequency signals 104a and 104b in accordance with one or more operation modes, as described herein. For example, receive antenna 110a may receive the first instance of radio frequency signal 104a via channel 114a and the first instance of radio frequency signal 104b via channel 114c. In accordance with this example, receive antenna 110b may receive the second instance of radio frequency signal 104a via channel 114b and the second instance of radio frequency signal 104b via channel 114d. In the exemplary embodiment shown in FIG. 1B, multi-mode, programmable receiver system 108 is configured to receive radio frequency signals 104a and 104b in accordance with one or more of an MP-HSDPA mode, a Type3I mode, a Type3 mode, or other operation mode(s) as would be apparent to persons skilled in the relevant art(s) from the teachings herein.

Figure 1C:
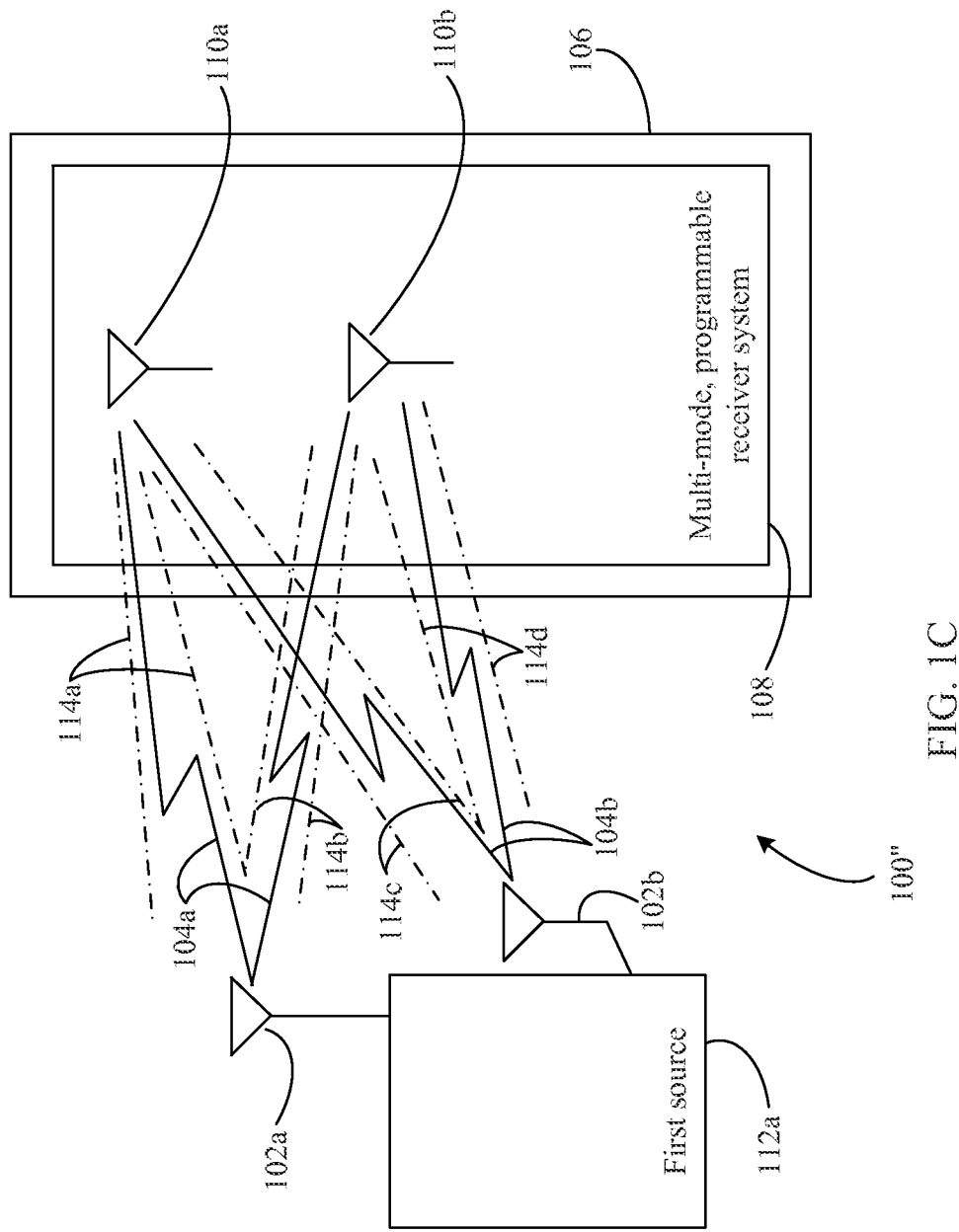

FIG. 1C is a block diagram of a communication system 100", which is another example implementation of a communication system 100 shown in FIG. 1A, in accordance with an embodiment described herein. Generally speaking, communication system 100" operates to provide voice and/or data communications to communication device(s) in accordance with one or more communication protocols. In accordance with example embodiments, communication system 100" is configured to provide voice and/or data communications to such communication device(s) from multiple antennas (e.g., transmit antennas 102a and 102b) that are communicatively coupled to a first source (e.g., first source 112a) based on one or more of the communication protocols described herein.

As shown in FIG. 1C, communication system 100" includes communication device 106, a first transmit antenna 102a, and a second transmit antenna 102b. It is contemplated, however, that in accordance with some embodiments, additional (or fewer) transmit antennas (e.g., transmit antennas 102a-102n, as shown in FIG. 1A) and additional communication devices 106 may be included in communication system 100". First transmit antenna 102a and second transmit antenna 102b are communicatively coupled to first source 112a. First source 112a is configured as a serving cell for a MIMO operation mode or an STTD operation mode. First transmit antenna 102a and second transmit antenna 102b transmit radio frequency signals 104a and 104b, respectively.

Radio frequency signal 104a is transmitted via channels 114a and 114b, and radio frequency signal 104b is transmitted via channels 114c and 114d. For example, a first instance of radio frequency signal 104a may be transmitted via channel 114a, and a second instance of radio frequency signal 104a may be transmitted via channel 114b. In accordance with this example, a first instance of radio frequency signal 104b may be transmitted via channel 114c, and a second instance of radio frequency signal 104b may be transmitted via channel 114d.

Multi-mode, programmable receiver system 108 includes two receive antennas 110a and 110b for illustrative purposes and is not intended to be limiting. Receive antennas 110a and 110b are configured to receive of the radio frequency signals 104a and 104b in accordance with one or more operation modes, as described herein. For example, receive antenna 110a may receive a first instance of radio frequency signal 104a via channel 114a and a first instance of radio frequency signal 104b via channel 114c. Receive antenna 110b may receive a second instance of radio frequency signal 104a via channel 114b and a second instance of radio frequency signal 104b via channel 114d. In the exemplary embodiment shown in FIG. 1C, multi-mode, programmable receiver system 108 is configured to receive radio frequency signals 104a and 104b in accordance with one or more of a MIMO mode, an STTD mode, or other operation mode(s) as would be apparent to persons skilled in the relevant art(s) from the teachings herein.

III. Example Receiver System Embodiments

Figure 2A:
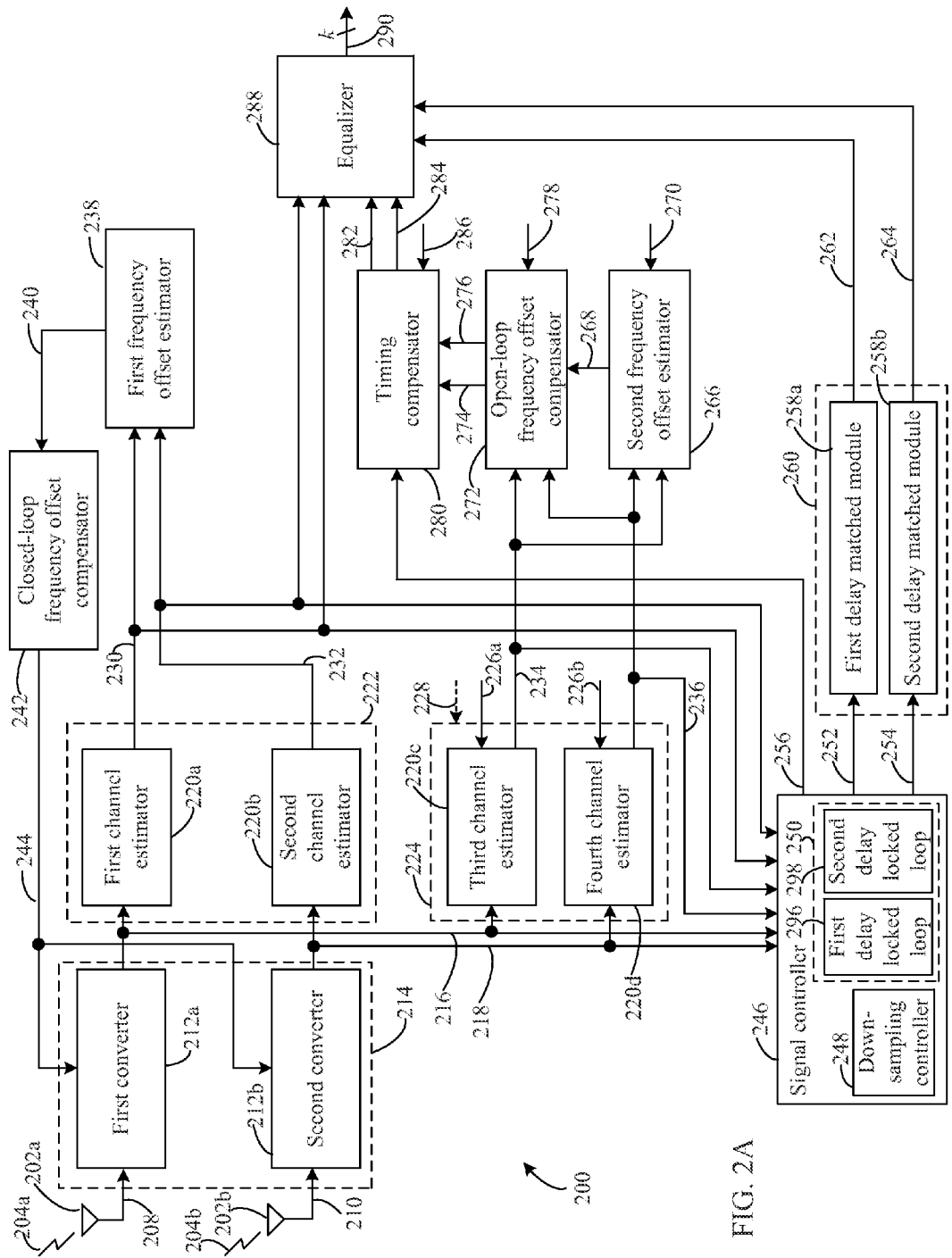
FIGS. 2A-2C are block diagrams of example implementations of a multi-mode, programmable receiver system shown in FIGS. 1A-1C in accordance with embodiments described herein.

FIG. 2A is a block diagram of a multi-mode, programmable receiver system 200, which is an example implementation of a multi-mode, programmable receiver system 108 shown in FIGS. 1A-1C, in accordance with an embodiment described herein. Generally speaking, multi-mode, programmable receiver system 200 may be configured to receive radio frequency signals from one or more transmit antennas (e.g., transmit antennas 102a-102n). In accordance with example embodiments, multi-mode, programmable receiver system 200 is configured to process received radio frequency signals (e.g., radio frequency signals 204a-204b) in accordance with one or more operation modes (e.g., MP-HSDPA, Type3, Type3I, MIMO, STTD, etc.), as described herein. In some example embodiments, multi-mode, programmable receiver system 200 is configured as a linear minimum mean square error (LMMSE) equalizer and is configured to receive and process the correlation and/or the covariance of received radio frequency signals (e.g., radio frequency signals 204a-204b).

As shown in FIG. 2A, multi-mode, programmable receiver system 200 includes multiple modules, at least some of which are programmable to be selectively enabled or disabled (as discussed further below). Multi-mode, programmable receiver system 200 includes a first receive antenna 202a and a second receive antenna 202b, which are configured to enable reception of respective radio frequency signals 204a and 204b, from one or more transmit antennas (e.g., any one or more of transmit antennas 102a-102n, as shown in FIGS. 1A-1C). Communication(s) from a transmit antenna are received at a receive antenna via a channel (e.g., one of channels 114a-114d). For instance, communication(s) received from a first transmit antenna (e.g., transmit antenna 102a) may be received at first receive antenna 202a via a first channel (e.g., channel 114a); communications from the first transmit antenna (e.g., transmit antenna 102a) may be received at second receive antenna 202b via a second channel (e.g., channel 114b); communication(s) received from a second transmit antenna (e.g., transmit antenna 102b) may be received at first receive antenna 202a via a third channel (e.g., channel 114c); communications from the second transmit antenna (e.g., transmit antenna 102b) may be received at second receive antenna 202b via a fourth channel (e.g., channel 114d), and so on. It is also contemplated that radio frequency signals 204a and 204b, though each illustrated as a separate signal, may be respective instances of a common (e.g., same) radio frequency signal.

Multi-mode, programmable receiver system 200 further includes a converter block 214. Converter block 214 includes a first converter 212a and a second converter 212b. Radio frequency signals 204a and 204b are received by respective first and second converters 212a and 212b from respective first and second receive antennas 202a and 202b via respective antenna signal lines 208 and 210. First and second converters 212a and 212b are configured to convert respective radio frequency signals 204a and 204b into respective first and second baseband signals. The conversion to first and second baseband signals (e.g., signals on baseband signal lines 216 and 218) is performed using a sampling rate(s) that may be greater than a transmit antenna carrier frequency by a factor of 8, 16, 32, or 64 (i.e., oversampling), though in some embodiments, different over-sampling rates may be used, as would be apparent to persons skilled in the relevant art(s) having the benefit of this disclosure.

Multi-mode, programmable receiver system 200 further includes a first channel estimation block 222 and a second channel estimation block 224. First channel estimation block 222 includes a first channel estimator 220a and a second channel estimator 220b. Second channel estimation block 224 includes a third channel estimator 220c and a fourth channel estimator 220d. The first baseband signal on baseband signal line 216 is received by first channel estimator 220a, third channel estimator 220c, and a signal controller 246 (discussed in detail below). The second baseband signal on baseband signal line 218 is received by second channel estimator 220b, fourth channel estimator 220d, and signal controller 246. Channel estimators 220a-220d are configured to perform a first channel estimation of a first channel (e.g., an estimation of channel 114a), a second channel estimation of a second channel (e.g., an estimation of channel 114b), a third channel estimation of a third channel (e.g., an estimation of channel 114c), and a fourth channel estimation of a fourth channel (e.g., an estimation of channel 114d). In some embodiments, each of the channel estimators 220a-220d may be configured as a cluster-path processor which is configured to process multiple paths (i.e., "taps") in a given channel (e.g., one of channels 114a-114d). For example, as previously described, a given channel may include one or more "taps" within the channel (e.g., two, four, eight, or sixteen "taps" may be present per channel (e.g., in any one or more of channels 114a-114d)). Channel estimators 220a-220d process these clusters of "taps" to generate respective channel estimations for the respective channels.

A first channel estimation, a second channel estimation, a third channel estimation, and a fourth channel estimation are generated by respective channel estimators 220a-220d from samples of the sampled representations of the first baseband signal and the second baseband signal using scrambling codes and common pilot channel patterns included in transmitted radio frequency signals (e.g., radio frequency signals 104a-104n) transmitted via the respective one or more transmit antennas (e.g., transmit antennas 102a-102n, as shown in FIGS. 1A-1C). The scrambling codes and common pilot channel patterns of the transmit antennas (e.g., transmit antennas 102a-102n) have little or no correlation, and thus may be used to effectively process signals from the transmit antennas to generate the channel estimations. The first channel estimation and the second channel estimation are transmitted to a first frequency offset estimator 238 and to an equalizer 288 via first and second channel estimation lines 230 and 232, respectively. The third channel estimation and the fourth channel estimation are transmitted to a second frequency offset estimator 266 and to an open-loop frequency offset compensator 272 via third and fourth channel estimation lines 234 and 236, respectively. The first channel estimation, the second channel estimation, the third channel estimation, and the fourth channel estimation are transmitted to signal controller 246 via channel estimation line 230, channel estimation line 232, channel estimation line 234, and channel estimation line 236, respectively.

Third channel estimator 220c, fourth channel estimator 220d, and second channel estimation block 224 may receive respective enable/disable signals 226a, 226b, and 228. As shown in FIG. 2A, third channel estimator 220c, fourth channel estimator 220d, and second channel estimation block 224 are enabled in accordance with the operation mode in which multi-mode, programmable receiver system 200 operates (e.g., MP-HSDPA and/or Type3I with symbol equalization), but may be disabled in some embodiments according to other operation modes. Enable/disable signals 226a, 226b, and/or 228 may be a common signal, or may be separate independent signals, and may be generated by hardware, or a combination of hardware and software and/or firmware internal to or external to multi-mode, programmable receiver system 200. In some embodiments, enable/disable signals 226a, 226b, and/or 228 may be effectively generated using a clock-gating scheme.

Multi-mode, programmable receiver system 200 further includes first frequency offset estimator 238. First frequency offset estimator 238 is configured to determine a first frequency offset, which indicates a difference between a first carrier frequency associated with a first transmit antenna (e.g., one of transmit antennas 102a-102n, such as 102a, as shown in FIGS. 1A-1C) and a frequency synthesized by a local crystal oscillator (not shown). Such a difference may be caused by crystal drift, for example. Crystal drift may occur when the frequency of an oscillator (e.g., the local crystal oscillator) varies over time due to age of, and changes in, oscillator components. First frequency offset estimator 238 determines the first carrier frequency based on the first channel estimation and the second channel estimation. First frequency offset estimator transmits an indication of the first frequency offset to a closed-loop frequency offset compensator 242 via first frequency offset line 240. Closed-loop frequency offset compensator 242 determines a compensation parameter to compensate for the first frequency offset. Closed-loop frequency offset compensator 242 adjusts the local crystal oscillator frequency or a frequency associated with a first transmit antenna (e.g., one of transmit antennas 102a-102n, such as 102a, as shown in FIGS. 1A-1C) based on the compensation parameter. An indication of the adjusted frequency is transmitted to first and second converters 212a and 212b via closed-loop compensator line 244 to match the carrier frequency of the first transmit antenna to the frequency of the local crystal oscillator (not shown).

Multi-mode, programmable receiver system 200 further includes signal controller 246. Signal controller 246 is configured to reduce an oversampling rate associated with the first baseband signal (received from first converter 212a via baseband signal line 216) and the second baseband signal (received from second converter 212b via baseband signal line 218) to provide a first two-times chip-rate sampling frequency representation of the first baseband signal and a second two-times chip-rate sampling frequency representation of the second baseband signal, respectively, via respective two-times signal lines 252 and 254. Signal controller 246 includes a down-sampling controller 248 for performing the oversampling rate reduction. For example, received radio frequency signals 204a and 204b are sampled at relatively high sampling rates (e.g., 8 times, 16 times, 32 times or 64 times oversampling) at first and second converters 212a and 212b. Down-sampling controller 248 reduces the sampling rate of the baseband signals down to two times oversampling (i.e., "oversampling-by-two"). It is contemplated that in some embodiments, the oversampling rate reduction may be performed to reduce the frequency to a factor other than two but that is lower than the received frequency. The first and second two-times chip-rate sampling frequency representations are transmitted to first delay matched module 258a and second delay matched module 258b, respectively.

Signal controller 246 is further configured to reduce timing drift (i.e., sampling phase) associated with sampled representations of the first and second baseband signals. That is, timing drift within a sampled representation of a baseband signal is reduced. Signal controller 246 further includes a delay locked loop (DLL) block 250. Delay locked loop block 250 includes a first delay locked loop 296 and a second delay locked loop 298. For example, first and second delay locked loops 296 and 298 may adjust a phase of a scrambling code within a signal. In some embodiments, an adjustment that is performed by first and second delay locked loops 296 and 298 may be performed according to the first channel estimation and second channel estimation.

Multi-mode, programmable receiver system 200 further includes a delay matched module block 260. Delay matched module (DMM) block 260 includes first delay matched module 258a and second delay matched module 258b. First delay matched module 258a is configured to delay the first two-times chip-rate sampling frequency representation to compensate for a first delay associated with first channel estimator 220a to provide a first time adjusted signal via signal line 262 to equalizer 288. Second delay matched module 258b is configured to delay the second two-times chip-rate sampling frequency representation to compensate for a second delay associated with second channel estimator 220b to provide a second time adjusted signal via signal line 264 to equalizer 288. The first channel estimation and the second channel estimation may have associated timing delays caused by the closed-loop delay. First delay matched module 258a and second delay matched module 258b delay the on-time signals (e.g., the first and the second two-times chip-rate sampling frequency representations) going into equalizer 288 to compensate for the associated timing delay. First and second time adjusted signals via signal lines 262 and 264, respectively, are delayed instances of the first and the second two-times chip-rate sampling frequency representations.

Multi-mode, programmable receiver system 200 further includes a second frequency offset estimator 266, an open-loop frequency offset compensator 272, and a timing compensator 280. Second frequency offset estimator 266 is enabled to determine a second frequency offset that indicates a difference between the first carrier frequency and a second carrier frequency that is associated with a second transmit antenna (e.g., second transmit antenna 102b, as shown in FIGS. 1A-1B). Second frequency offset estimator 266 receives an indication of the first carrier frequency, based on the third channel estimation, via third channel estimation line 234. Second frequency offset estimator 266 receives an indication of the second carrier frequency, based on the fourth channel estimation, via fourth channel estimation line 236. Second frequency offset estimator 266 transmits an indication of the determined frequency difference between the first carrier frequency and the second carrier frequency to open-loop frequency offset compensator 272 via second frequency offset line 268.

Open-loop frequency offset compensator 272 is enabled to compensate for the difference between a first carrier frequency and a second carrier frequency by adjusting at least one of a phase associated with the third channel estimation or a phase associated with the fourth channel estimation. Open-loop frequency offset compensator 272 receives the third channel estimation and the fourth channel estimation via respective third and fourth channel estimation lines 234 and 236. Open-loop frequency offset compensator 272 compensates for the determined frequency difference between the first carrier frequency and the second carrier frequency using the indication of the determined frequency difference between the first carrier frequency and the second carrier frequency, which is transmitted to open-loop frequency offset compensator 272 via second frequency offset line 268. The third channel estimation and the fourth channel estimation, which may have respective frequency compensations, are transmitted to timing compensator 280 via a first compensated frequency line 274 and a second compensated frequency line 276, respectively. It is contemplated that in some embodiments, the third channel estimation and/or the fourth channel estimation may have no frequency compensation or negligible frequency compensation.

Timing compensator 280 is enabled to compensate for a sampling timing difference between a first sampling timing that is associated with the first transmit antenna and a second sampling timing that is associated with the second transmit antenna. As shown in FIG. 2A, signal controller 246 transmits a timing information signal via a timing information signal line 256 to timing compensator 280. The timing information signal may include timing information with respect to the first, second, third, and fourth channel estimations. For example, the timing information signal may include information regarding the first sampling timing that is associated with the first transmit antenna and information regarding the second sampling timing that is associated with the second transmit antenna. Timing compensator 280 compensates for the difference between the first and second sampling timings using the information received via timing information signal line 256. It is contemplated that in some embodiments, additional or alternative timing-related information may be received by timing compensator 280 to perform timing compensation for one or more differences between a first sampling timing that is associated with the first transmit antenna and a second sampling timing that is associated with the second transmit antenna. Timing compensator 280 transmits information that indicates the timing compensation associated with the sampling timing difference to equalizer 288 via first and second timing compensation lines 282 and 284, respectively.

By compensating for the difference between the first sampling timing and the second sampling timing using timing compensator 280, proper decoding of information that is included in radio frequency signals 204a and 204b can be achieved, for example, in a communication system (e.g., communication systems 100 and 100') that implements an MP-HSDPA mode or a Type3I mode with symbol equalization. In an MP-HSDPA mode, improper alignment between radio frequency signals (e.g., radio frequency signals 104a and 104b, as shown in FIG. 1B), channel estimations (e.g., signals on channel estimation line 230, channel estimation line 232, channel estimation line 234, and/or channel estimation line 236), loop delay (e.g., closed-loop delay, as discussed above), and/or the like, may inhibit (e.g., prevent) proper decoding because a communication device (e.g., communication device 106, as shown in FIG. 1B) and its corresponding multi-mode, programmable receiver system (e.g., multi-mode, programmable receiver systems 108 and 200) receive information from both a serving cell (e.g., first source 112a) and a multi-point serving cell (e.g., second source 112b). In a Type3I mode, improper alignment between radio frequency signals may also inhibit (e.g., prevent) proper decoding because, although the second transmit antenna may transmit a radio frequency signal (e.g., 104b) from an interfering cell (e.g., second source 112b) that does not provide information to the communication device, radio frequency signals (e.g., radio frequency signal 104b, as shown in FIG. 1B) of the interfering cell may nevertheless interfere with the communication device receiving radio frequency signals (e.g., radio frequency signal 104a, as shown in FIG. 1B) from a first transmit antenna (e.g., first transmit antenna 102a, as shown in FIG. 1B) that is associated with a serving cell. By properly aligning interfering signals, cross-talk and interference between serving cell signals and interfering signals may be reduced and/or minimized.

Each of the second frequency offset estimator 266, open-loop frequency offset compensator 272, and timing compensator 280 may receive a respective enable/disable signal 270, 278, and 286. As shown, second frequency offset estimator 266, open-loop frequency offset compensator 272, and timing compensator 280 are enabled in accordance with the operation mode in which multi-mode, programmable receiver system 200 operates (e.g., MP-HSDPA and/or Type3I with symbol equalization), but may be disabled in some embodiments according to other operation modes. Enable/disable signals 270, 278, and/or 286 may be the same signal, or may be different independent signals, and may be generated by hardware, or a combination of hardware and software and/or firmware internal to or external to multi-mode, programmable receiver system 200. In some embodiments, enable/disable signals 270, 278, and/or 286 may effectively be generated using a clock-gating scheme.

Multi-mode, programmable receiver system 200 further includes an equalizer 288. Equalizer 288 is configured to perform alignment of the channel estimations (e.g., one or more of the first channel estimation, the second channel estimation, the third channel estimation and/or the fourth channel estimation) and is further configured to reduce and/or eliminate channel interference and cross-talk between the radio frequency signals that are received at the receive antennas 202a and 202b. As shown in FIG. 2A, equalizer 288 receives the first channel estimation and the second channel estimation via channel estimation line 230 and channel estimation line 232. Equalizer 288 receives frequency and phase adjusted information relating to the third channel estimation and the fourth channel estimation via first timing compensation line 282 and second timing compensation line 284, respectively. Equalizer 288 also receives a first time adjusted signal and a second time adjusted signal via respective signal line 262 and signal line 264. Using these received inputs, equalizer 288 processes and aligns information related to the channel estimations (e.g., one or more of the first channel estimation, the second channel estimation, the third channel estimation and/or the fourth channel estimation) and transmits an output via equalizer output line 290 for processing by other circuit element(s) (not shown) (e.g., other circuit elements of the communication device that includes multi-mode, programmable receiver system 200). Equalizer output line 290 may include one or more lines in some embodiments; that is, equalizer output line 290 may include k lines, where k is an integer. For example, in the example embodiment illustrated in FIG. 2A, when multi-mode, programmable receiver system 200 operates according to an MP-HSDPA or Type3I mode, k equals two.

Equalizer 288 may include a symbol equalizer and/or a chip equalizer in accordance with the operation mode in which multi-mode, programmable receiver system 200 operates. For example, a symbol equalizer and/or a chip equalizer may be included according to an MP-HSDPA mode, and a symbol equalizer may be included according to a Type3I mode with symbol equalization. It is contemplated that in some embodiments, additional equalizers of varying types may be included in equalizer 288 according to different operation modes as would be apparent to persons skilled in the relevant art(s) having the benefit of this disclosure.

Figure 2B:
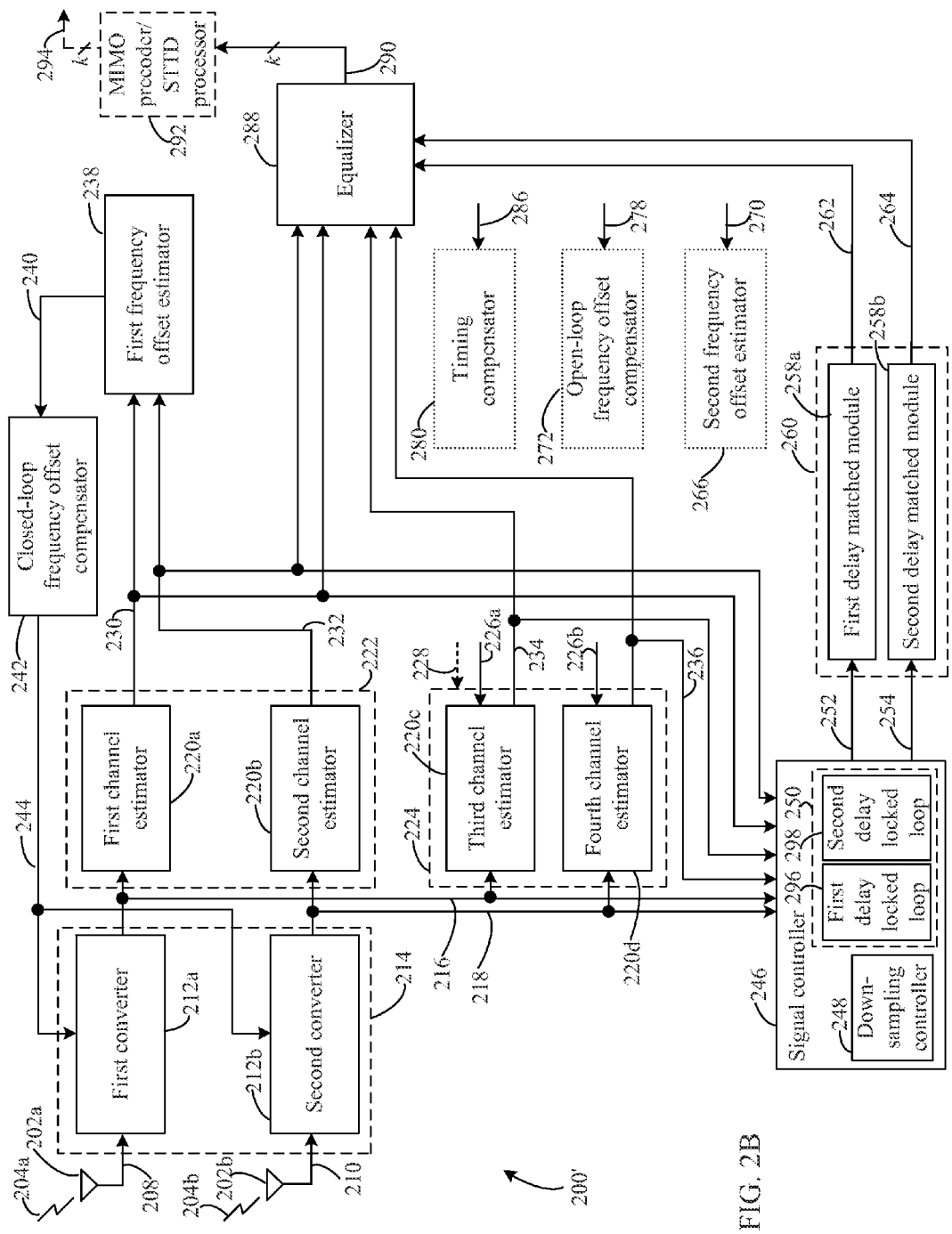

FIG. 2B is a block diagram of a multi-mode, programmable receiver system 200', which is another example implementation of a multi-mode, programmable receiver system 108 shown in FIGS. 1A-1C, in accordance with an embodiment described herein. As shown in FIG. 2B, multi-mode, programmable receiver system 200' includes the same elements as multi-mode, programmable receiver system 200 shown in FIG. 1A plus an optional a MIMO precoder/STTD processor 294, which is described in further detail below. Some of the elements that are included in multi-mode, programmable receiver system 200' may be selectively, programmably enabled or disabled (as discussed herein) based on a specified operation mode of the plurality of operation modes in accordance with which multi-mode, programmable receiver system 200' is configured to operate. In some example embodiments, multi-mode, programmable receiver system 200' is configured as a linear minimum mean square error (LMMSE) equalizer and is configured to receive and process the correlation and/or the covariance of received radio frequency signals (e.g., radio frequency signals 204a and 204b).

As shown in FIG. 2B, multi-mode, programmable receiver system 200' is programmably configured to operate in accordance with at least one of a Type3I mode with chip equalization, a MIMO mode, and/or an STTD mode. For instance, second frequency offset estimator 266, open-loop frequency offset compensator 272, and timing compensator 280 are disabled (as shown using dotted outlines). Second frequency offset estimator 266, open-loop frequency offset compensator 272, and timing compensator 280 are disabled via enable/disable lines 270, 278, and 286, respectively, as described above with respect to FIG. 2A. As previously noted herein, communication systems (e.g., communication systems 100, 100', and 100" as illustrated in FIGS. 1A-1C) with Type3I modes with chip equalization, MIMO modes, and/or STTD modes operate by communicating information/data from one source/serving cell (e.g., a first source 112a, as shown in FIGS. 1A-1C) via one or more transmit antennas (e.g., one or more of transmit antennas 102a and 102b) to a communication device (e.g., communication device 106). As such, there is no information/data from a second transmit antenna of a second source (e.g. to be processed and/or decoded), and thus frequency and phase adjustments with respect to a second transmit antenna of a second source need not be made. Accordingly, second frequency offset estimator 266, open-loop frequency offset compensator 272, and timing compensator 280 are disabled.

Third channel estimation line 234 and fourth channel estimation line 236 are effectively connected directly to equalizer 288. That is, for clarity and illustration, third channel estimation line 234 and fourth channel estimation line 236 are shown as providing a direct connection between third channel estimator 220c and fourth channel estimator 220d (respectively) and equalizer 288. In other words, the inputs and outputs of the disabled modules (e.g., second frequency offset estimator 266, open-loop frequency offset compensator 272, and timing compensator 280 as shown in FIG. 2B) are not shown for illustrative purposes. It is to be appreciated, however, that any physical connections related to these signals as shown in FIG. 2A may, in practice, be bypassed, programmably rerouted, and/or the like as would be apparent to persons skilled in the relevant art(s) having the benefit of this disclosure. In some embodiments, disabled modules (e.g., second frequency offset estimator 266, open-loop frequency offset compensator 272, and timing compensator 280 as shown in FIG. 2B) may be programmed and/or configured to allow their respective inputs to "pass through" the disabled modules and be transmitted as outputs in an unaltered state.

Equalizer 288 of multi-mode, programmable receiver system 200' may transmit its output signal(s) via equalizer output line 290 to be received by MIMO precoder/STTD processor 294 according to a MIMO mode or an STTD mode. MIMO precoder/STTD processor 294 may perform post-equalization precoding and/or processing upon the output signal(s) of equalizer 288, according to a MIMO mode or an STTD mode. The output of the MIMO precoder/STTD processor 294 may be transmitted to other module(s) (not shown) (e.g., of the communication device that includes multi-mode, programmable receiver system 200') via post-equalizer process line 294.

Figure 2C:
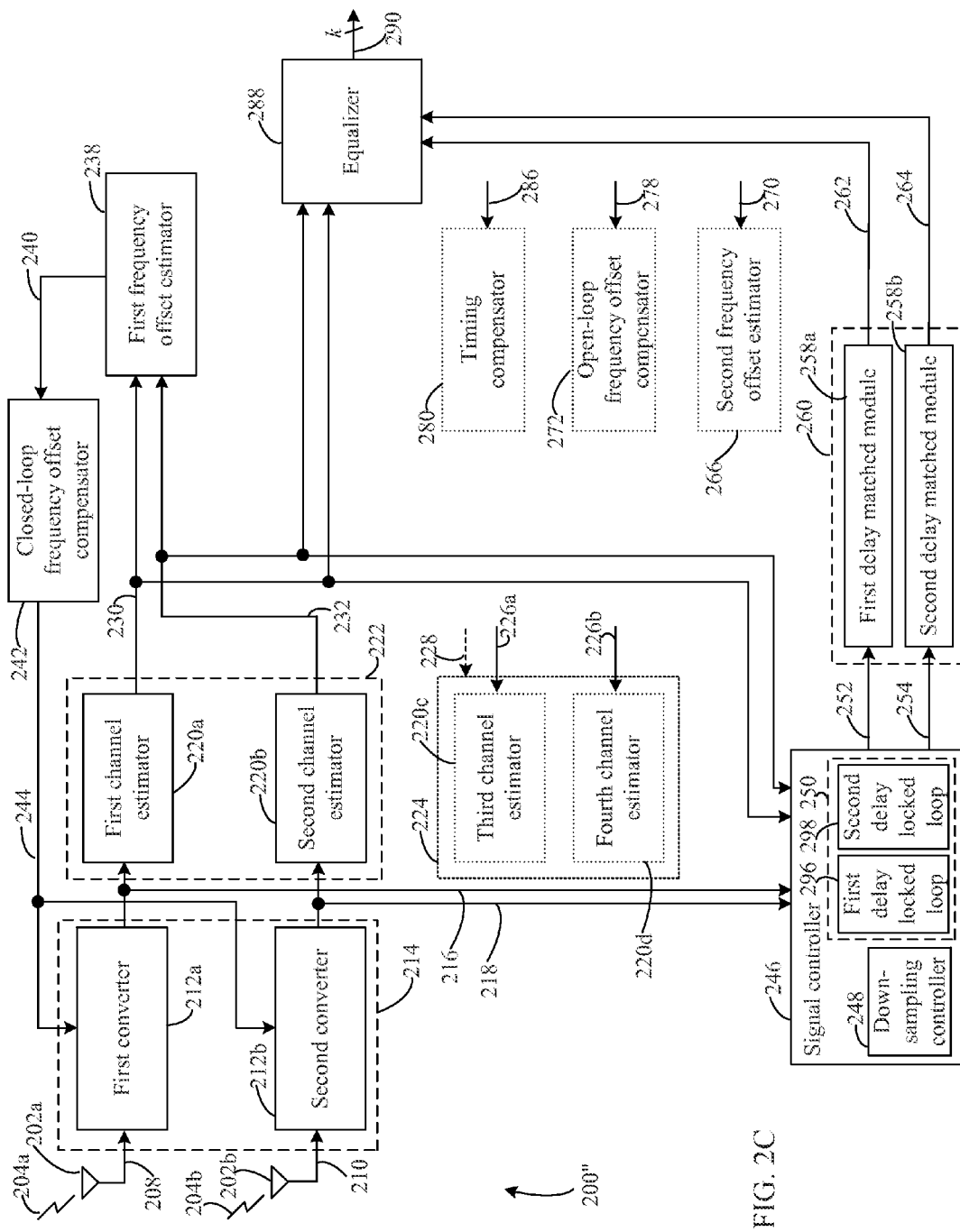

FIG. 2C is a block diagram of a multi-mode, programmable receiver system 200", which is yet another example implementation of a multi-mode, programmable receiver system 108 shown in FIGS. 1A-1C, in accordance with an embodiment described herein. As shown in FIG. 2C, multi-mode, programmable receiver system 200" includes the same elements as multi-mode, programmable receiver system 200 shown in FIG. 1A. Some of the elements that are included in multi-mode, programmable receiver system 200" may be selectively, programmably enabled or disabled (as discussed herein) based on a specified operation mode of the plurality of operation modes in accordance with which multi-mode, programmable receiver system 200" is configured to operate. In some example embodiments, multi-mode, programmable receiver system 200" is configured as a linear minimum mean square error (LMMSE) equalizer and is configured to receive and process the correlation and/or the covariance of received radio frequency signals (e.g., radio frequency signal 204a). Multi-mode, programmable receiver system 200" of FIG. 2C includes multiple modules, some of which may be selectively, programmably enabled or disabled (as discussed herein) based on a specified operation mode of the plurality of operation modes in accordance with which multi-mode, programmable receiver system 200" is configured to operate.

As shown in FIG. 2C, multi-mode, programmable receiver system 200" is programmably configured to operate in accordance with a Type3 mode. For instance, second frequency offset estimator 266, open-loop frequency offset compensator 272, and timing compensator 280 are disabled (as shown using dotted outlines). Second frequency offset estimator 266, open-loop frequency offset compensator 272, and timing compensator 280 are disabled via enable/disable lines 270, 278, and 286, respectively, as described above with respect to FIG. 2A. Third channel estimator 220c and fourth channel estimator 220d (as well as second channel estimation block 224) are also disabled (as shown using dotted outlines). Third channel estimator 220c, fourth channel estimator 220d, and second channel estimation block 224 are disabled via enable/disable lines 226a, 226b, and 228, respectively, as described above with respect to FIG. 2A. As previously noted herein, communication systems (e.g., as illustrated in FIGS. 1A-1C) with Type3 modes operate by communicating information/data from one source/serving cell (e.g., first source 112a, as shown in FIGS. 1A-1C) via one transmit antenna (e.g., transmit antennas 102a) to a communication device (e.g., communication device 106). As such, there is no information/data from a second transmit antenna of a second source to be processed and/or decoded, and thus frequency and phase adjustments with respect to a second transmit antenna of a second source do not need to be made. Additionally, because Type3 modes operate using a single transmit antenna (e.g., transmit antenna 102a) at a given serving cell (e.g., first source 112a), first and second channel estimators 220a and 220b (and not third and fourth channel estimators 220c and 220d) are needed for properly decoding received radio frequency signals (e.g., radio frequency signals 204a-204b, respectively). Accordingly, second frequency offset estimator 266, open-loop frequency offset compensator 272, timing compensator 280, third channel estimator 220c, fourth channel estimator 220d, and second channel estimation block 224 are disabled.

In the illustrated embodiment of FIG. 2C, third channel estimation line 234 and fourth channel estimation line 236 are not shown. That is, for clarity and illustration, third channel estimation line 234 and fourth channel estimation line 236 are omitted. In other words, the inputs and outputs of the disabled modules (e.g., second frequency offset estimator 266, open-loop frequency offset compensator 272, timing compensator 280, third channel estimator 220c, fourth channel estimator 220d, and second channel estimation block 224 as shown in FIG. 2C) are not shown for illustrative purposes. It is to be appreciated, however, that any physical connections related to these signals as shown in FIG. 2A may, in practice, be bypassed, programmably rerouted, and/or the like, as would be apparent to persons skilled in the relevant art(s) having the benefit of this disclosure. In some embodiments, disabled modules (e.g., second frequency offset estimator 266, open-loop frequency offset compensator 272, timing compensator 280, third channel estimator 220c, fourth channel estimator 220d, and second channel estimation block 224 as shown in FIG. 2C) may be programmed and/or configured to allow their respective inputs to "pass through" the disabled modules and be transmitted as outputs, unaltered.

It is contemplated that in some embodiments, a multi-mode, programmable receiver system (e.g., multi-mode, programmable receiver system 200 as shown in FIG. 2A) operating in accordance with an MP-HSDPA mode or a Type3I mode, may be programmably configured to operate in accordance with a Type3 mode (e.g., as shown in FIG. 2C) when the proximity of the multi-mode, programmable receiver system to a transmit antenna of its serving cell (e.g., transmit antenna 102a as shown in FIG. 1B) is such that data transmissions from a multi-point serving cell or interference from an interfering cell (e.g., from transmit antenna 102b as shown in FIG. 1B) are negligible compared to the data transmissions from its serving cell. By programmably configuring the receiver system to operate in accordance with a Type3 mode in this manner, power consumption by the receiver system may be reduced.

Figure 3:
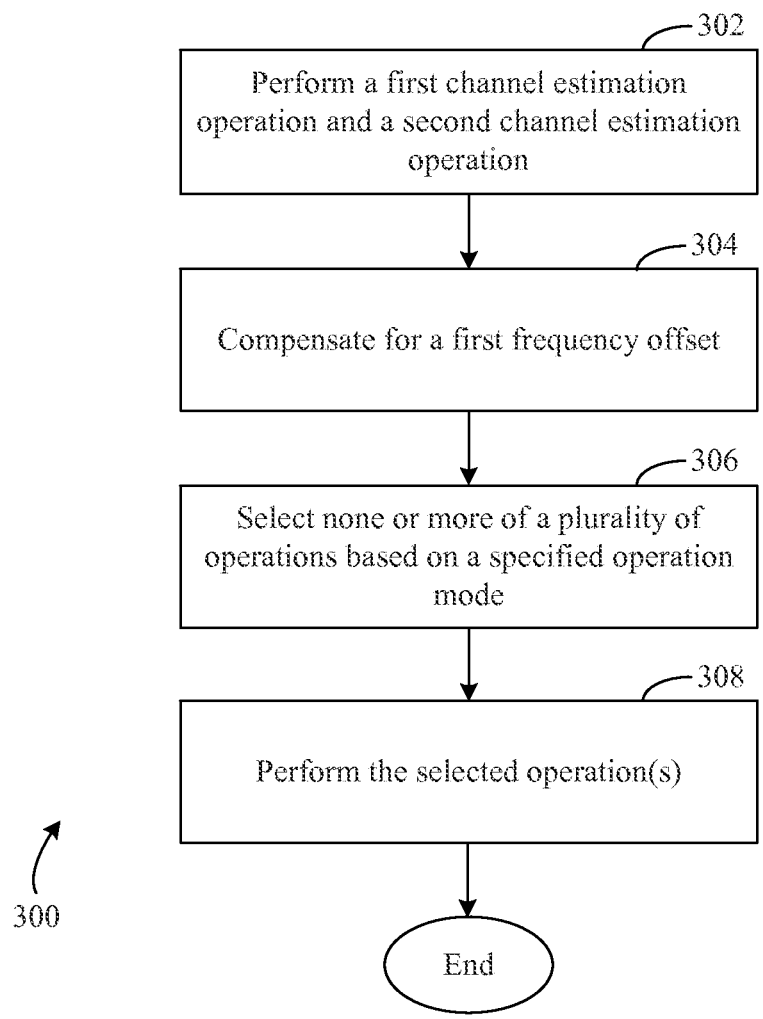
FIG. 3 depicts a flowchart of an example method for receiving and processing communications at a multi-mode, programmable receiver system in accordance with an embodiment described herein.

FIG. 3 depicts a flowchart 300 of an example method for receiving and processing communications at a multi-mode, programmable receiver system in accordance with an embodiment described herein. For example, flowchart 300 may be performed by multi-mode, programmable receiver system 200 of FIG. 2A, multi-mode, programmable receiver system 200' of FIG. 2B and/or multi-mode, programmable receiver system 200" of FIG. 2C. Accordingly, flowchart 300 is described with respect to multi-mode, programmable receiver system 200. Further structural and operational embodiments will be apparent to persons skilled in the relevant art(s) based on the discussion regarding flowchart 300.

At step 302, a first channel estimation operation and a second channel estimation operation are performed by a first channel estimator and a second channel estimator, respectively, in a multi-mode, programmable receiver system. For instance, radio frequency signals transmitted from a first transmit antenna may be received by the multi-mode, programmable receiver system via a first receive antenna (associated with a first channel) and a second receive antenna (associated with a second channel) and may be converted into first and second baseband signals. The first channel estimation and the second channel estimation may be generated by the first channel estimator and second channel estimator, respectively, from sampled representations of the baseband signals using scrambling code(s) and common pilot channel pattern(s) that are associated with the first transmit antenna. In an example implementation, first channel estimator 220a and second channel estimator 220b receive baseband signal representations of radio frequency signals 204a and 204b via lines 216 and 218 respectively. First channel estimator 220a and second channel estimator 220b perform the first channel estimation operation and the second channel estimation operation using scrambling code(s) and common pilot channel pattern(s) associated with the first transmit antenna 102a.

At step 304, compensation for a first frequency offset is performed. The first frequency offset is equal to the difference between a first carrier frequency associated with the transmit antenna and a frequency synthesized for the multi-mode, programmable receiver system by a local crystal oscillator. In an example implementation, closed-loop frequency offset compensator 242 receives an estimation of the first frequency offset via first frequency line 240 and determines a compensation parameter to compensate for the first frequency offset by adjusting the local crystal oscillator frequency or the frequency associated with a first transmit antenna (e.g., one of transmit antennas 102a-102n, such as 102a, as shown in FIGS. 1A-1C). The adjusted frequency is transmitted to first and second converters 212a and 212b via closed-loop compensator line 244.

At step 306, none or more (e.g., zero, one, all, etc.) of a plurality of operations in accordance with which the multi-mode, programmable receiver system is configured to operate are selected based on a specified operation mode. The specified operation mode is the mode under which the multi-mode, programmable receiver system operates. In an example implementation, multi-mode, programmable receiver system 200 may operate according to an MP-HSDPA mode and/or a Type3I mode with symbol equalization. In another example implementation, multi-mode, programmable receiver system 200' may operate according to a Type3I mode with chip equalization, a MIMO mode, and/or an STTD mode.

At step 308, the selected operation(s) are performed. Performing the selected operation(s) includes enabling module(s) that are configured to perform the selected operation(s) and disabling other module(s) that are configured to perform other(s) of the plurality of operations. In an example implementation, third channel estimator 220c, fourth channel estimator 220d, second channel estimation block 224, second frequency offset estimator 266, open-loop frequency offset compensator 272, and timing compensator 280 are configured to be enabled or disabled via enable/disable lines 226a, 226b, 228, 270, 278, and 286, respectively.

In some example embodiments, one or more steps 302, 304, 306 and/or 308 of flowchart 300 may not be performed. For instance, it will be recognized that if none of the plurality of operations are selected at step 306, step 308 is not performed. Moreover, steps in addition to or in lieu of steps 302, 304, 306 and/or 308 may be performed. Further, in some example embodiments, one or more of steps 302, 304, 306 and/or 308 may be performed out of order, in an alternate sequence, or partially (or completely) concurrently with other steps.

Figure 4:
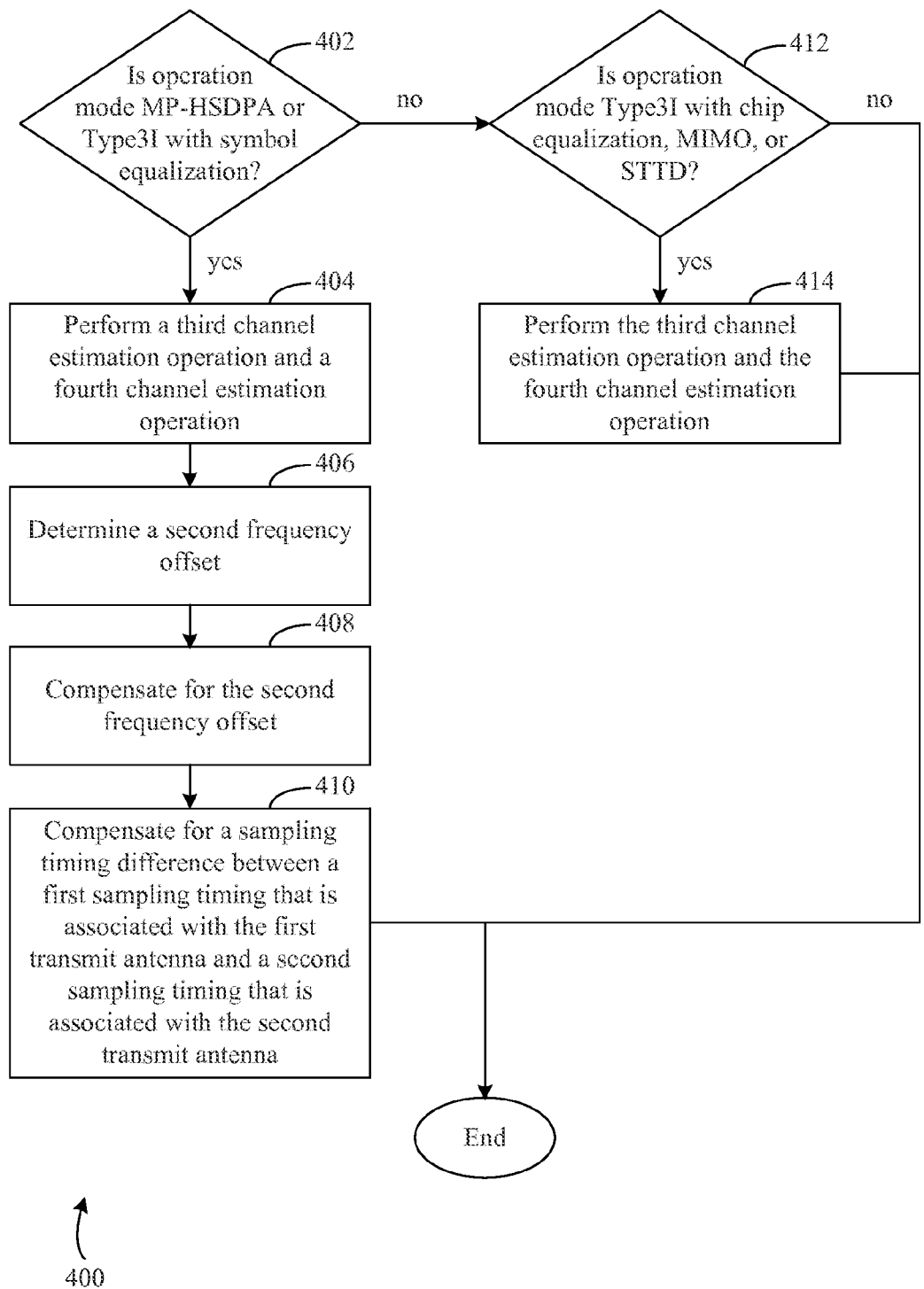
FIG. 4 depicts a flowchart of an example method for selecting and performing operations based on an operation mode in accordance with an embodiment described herein.

FIG. 4 depicts a flowchart 400 of an example method for selecting and performing operations based on an operation mode in accordance with an embodiment described herein. For instance, steps 306 and 308 of flowchart 300 may be performed in accordance with the steps shown in flowchart 400. For example, flowchart 400 may be performed by multi-mode, programmable receiver system 200 of FIG. 2A, multi-mode, programmable receiver system 200' of FIG. 2B and/or multi-mode, programmable receiver system 200" of FIG. 2C, though further structural and operational embodiments will be apparent to persons skilled in the relevant art(s) based on the discussion regarding flowchart 400.

In accordance with the example mentioned above, if a multi-mode, programmable receiver system (e.g., multi-mode, programmable receiver system 200) operates in accordance with an MP-HSDPA mode or a Type3I mode with symbol equalization, the selected none or more of the plurality of operations described with reference to flowchart 300 may include steps 404, 406, 408, and 410. If a multi-mode, programmable receiver system (e.g., multi-mode, programmable receiver system 200') operates in accordance with a Type3I mode with chip equalization, a MIMO mode, or an STTD mode, the selected none or more of the plurality of operations may include step 414. If a multi-mode, programmable receiver system (e.g., multi-mode, programmable receiver system 200") operates in accordance with a Type3 mode, the selected none or more of the plurality of operations may include no steps (e.g., none of the steps 404, 406, 408, 410, and 414).

At step 402, a determination is made whether the operation mode under which a multi-mode, programmable receiver system operates in an MP-HSDPA mode or a Type3I mode with symbol equalization. If the receiver operation mode is an MP-HSDPA mode or a Type3I mode with symbol equalization, the flow continues to step 404; if the receiver operation mode is not an MP-HSDPA mode or a Type3I mode with symbol equalization, the flow continues to step 412.

At step 404, a third channel estimation operation and a fourth channel estimation operation are performed by a third channel estimator and a fourth channel estimator, respectively, in a multi-mode, programmable receiver system. For instance, radio frequency signals transmitted from a second transmit antenna may be received by the multi-mode, programmable receiver system via a first receive antenna (associated with a third channel) and a second receive antenna (associated with a fourth channel) and may be converted to facilitate generation of the first baseband signal and the second baseband signal. The third and fourth channel estimations are generated by the third and fourth channel estimators, respectively, based on sampled representations of the baseband signals using scrambling code(s) and common pilot channel pattern(s) that are associated with the second transmit antenna. In an example implementation, third and fourth channel estimators 220c and 220d receive baseband signal representations of radio frequency signals 204a and 204b via lines 216 and 218 respectively. Third and fourth channel estimators 220c and 220d perform the third and fourth channel estimation operations using scrambling code(s) and common pilot channel pattern(s) associated with the second transmit antenna 102b.

At step 406, a second frequency offset is determined. The second frequency offset is equal to the difference between a first carrier frequency associated with the first transmit antenna and a second carrier frequency associated with the second transmit antenna. In an example implementation, the first carrier frequency is determined based on the third channel estimation on third channel estimation line 234, and the second carrier frequency is determined based on the fourth channel estimation on fourth channel estimation line 236. The third channel estimation and the fourth channel estimation are received at second frequency offset estimator 266. Second frequency offset estimator 266 transmits an indication of the determined frequency difference between the first carrier frequency and the second carrier frequency to open-loop frequency offset compensator 272 via second frequency offset line 268.

At step 408, compensation for the second frequency offset is performed. The compensation for the second frequency offset is performed by adjusting a phase associated with the third channel estimation regarding the third channel (e.g., channel 114c) and/or a phase associated with the fourth channel estimation regarding the fourth channel (e.g., channel 114d). In an example implementation, the first carrier frequency and the second carrier frequency are determined based on the third channel estimation and the fourth channel estimation (respectively) at open-loop frequency offset compensator 272, and compensation for the determined frequency difference is performed using the indication of the determined frequency difference between the first carrier frequency and the second carrier frequency, which is received by open-loop frequency offset compensator 272 via second frequency offset line 268. Third and fourth channel estimations, which may have respective frequency compensations, are transmitted to timing compensator 280 via a first compensated frequency line 274 and a second compensated frequency line 276, respectively.

At step 410, compensation for a sampling timing difference between a first sampling timing that is associated with the first transmit antenna and a second sampling timing that is associated with the second transmit antenna is performed. Timing information associated with the first channel (e.g., channel 114a), the second channel (e.g., channel 114b), the third channel (e.g., channel 114c), and the fourth channel (e.g., channel 114d) is received at a timing compensator. The first channel estimation, the second channel estimation, the third channel estimation, and the fourth channel estimation are also received at the timing compensator. The timing compensator adjusts a sampling timing associated with the third channel estimation or a sampling timing associated with the fourth channel estimation based on the received information. In an example implementation, signal controller 246 transmits timing information via timing information signal line 256 to timing compensator 280. Timing information received at signal controller 246 with respect to channel estimations of channel estimators 220a-220d is transmitted to timing compensator 280 via timing information signal line 256. Information associated with the first sampling timing and information associated with the second sampling timing may be transmitted via timing information signal line 256 and received at timing compensator 280. Timing compensator 280 compensates for the difference between the first and second sampling timings using the information received via timing information signal line 256. Timing compensator 280 transmits information related to the timing compensation associated with the sampling timing difference to equalizer 288 via first and second timing compensation lines 282 and 284 respectively.

At step 412, a determination is made whether the operation mode under which a multi-mode, programmable receiver system operates is a Type3I mode with chip equalization, a MIMO mode, or an STTD mode. If the receiver operation mode is a Type3I mode with chip equalization, a MIMO mode, or an STTD mode, the flow continues to step 414; if the receiver operation mode is not a Type3I mode with chip equalization, a MIMO mode, or an STTD mode, flowchart 400 ends.

At step 414, a third channel estimation operation and a fourth channel estimation operation are performed by first and second channel estimators, respectively, in a multi-mode, programmable receiver system. For instance, radio frequency signals transmitted from a second transmit antenna may be received by the multi-mode, programmable receiver system via the first receive antenna (associated with the third channel) and the second receive antenna (associated with the fourth channel) and may be converted into first and second baseband signals. The third and fourth channel estimations are generated by the third and the fourth channel estimators, respectively, based on sampled representations of the baseband signals using scrambling code(s) and common pilot channel pattern(s) that are associated with the second transmit antenna. In an example implementation, third and fourth channel estimators 220c and 220d receive baseband signal representations of radio frequency signals 204a and 204b via lines 216 and 218 respectively. Third and fourth channel estimators 220c and 220d perform the third and fourth channel estimation operations using scrambling code(s) and common pilot channel pattern(s) associated with the second transmit antenna.

In some example embodiments, one or more steps 402, 404, 406, 408, 410, 412, and/or 414 of flowchart 400 may not be performed. Moreover, steps in addition to or in lieu of steps 402, 404, 406, 408, 410, 412, and/or 414 may be performed. Further, in some example embodiments, one or more of steps 402, 404, 406, 408, 410, 412, and/or 414 may be performed out of order, in an alternate sequence, or partially (or completely) concurrently with other steps.

It will be recognized that the systems, their respective components, and/or the techniques described herein may be implemented in hardware, software, firmware, or any combination thereof, and/or may be implemented as hardware logic/electrical circuitry.

The disclosed technologies can be put into practice using software, firmware, and/or hardware implementations other than those described herein. Any software, firmware, and hardware implementations suitable for performing the functions described herein can be used.

IV. Conclusion

While various embodiments have been described above, it should be understood that they have been presented by way of example only, and not limitation. It will be understood by those skilled in the relevant art(s) that various changes in form and details may be made to the embodiments described herein without departing from the spirit and scope of the disclosed technologies as defined in the appended claims. Accordingly, the breadth and scope of the disclosed technologies should not be limited by any of the above-described exemplary embodiments, but should be defined only in accordance with the following claims and their equivalents.

What is claimed is:

1. A receiver system, comprising:
a channel estimation block configured to perform a first channel estimation with regard to a first channel between a first transmit antenna and a first receive antenna, a second channel estimation with regard to a second channel between the first transmit antenna and a second receive antenna, a third channel estimation with regard to a third channel between a second transmit antenna and the first receive antenna, and a fourth channel estimation with regard to a fourth channel between the second transmit antenna and the second receive antenna; and
an open-loop frequency offset compensator configured to compensate for a frequency offset that is equal to a difference between a first carrier frequency associated with the first transmit antenna and a second carrier frequency associated with the second transmit antenna by adjusting at least one of a phase associated with the third channel estimation or a phase associated with the fourth channel estimation, the open-loop frequency offset compensator being programmable to be selectively enabled or disabled based on a specified receiver operation mode, which is selected from a plurality of receiver operation modes, in accordance with which the receiver system is to operate.

2. The receiver system of claim 1, wherein the open-loop frequency offset compensator is configured to be enabled in response to the specified receiver operation mode including at least one of a multi-point high-speed downlink packet access (MP-HSDPA) mode or a Type3I mode; and
wherein the open-loop frequency offset compensator is configured to be disabled in response to the specified receiver operation mode including at least one of a Type3I mode, a Type3 mode, a multiple-input/multiple-output (MIMO) mode, or a space time transmit diversity (STTD) mode.

3. The receiver system of claim 1, further comprising:
a frequency offset estimator configured to determine the frequency offset;
wherein the frequency offset estimator is programmable to be selectively enabled or disabled based on the specified receiver operation mode.

4. The receiver system of claim 3, wherein the frequency offset estimator is configured to be programmably enabled in response to the specified receiver operation mode including at least one of an MP-HSDPA mode or a Type3I mode with symbol equalization; and
wherein the frequency offset estimator is configured to be programmably disabled in response to the specified receiver operation mode including at least one of a Type3I mode with chip equalization, a Type3 mode, a MIMO mode, or an STTD mode.

5. The receiver system of claim 1, further comprising at least one of:
a converter block configured to convert radio frequency signals received from the first transmit antenna and the second transmit antenna via the first receive antenna to a first baseband signal, the converter block being further configured to convert the radio frequency signals received via the second receive antenna to a second baseband signal;
a signal controller that includes:
a delay locked loop configured to reduce timing drift associated with the first baseband signal and to reduce timing drift associated with the second baseband signal, and
a down-sampling controller configured to reduce an oversampling rate associated with the first baseband signal and the second baseband signal to provide a first two-times chip-rate sampling frequency representation of the first baseband signal and a second two-times chip-rate sampling frequency representation of the second baseband signal;
a delay matched module block configured to delay the first two-times chip-rate sampling frequency representation to compensate for a first delay associated with the first channel estimation to provide a first time adjusted signal, the delay matched module block being further configured to delay the second two-times chip-rate sampling frequency representation to compensate for a second delay associated with the second channel estimation to provide a second time adjusted signal; or
an equalizer configured to process the first two-times chip-rate sampling frequency representation and the second two-times chip-rate sampling frequency representation using the first channel estimation, the second channel estimation, the third channel estimation, and the fourth channel estimation to provide an output signal.

6. A receiver system, comprising:
a channel estimation block configured to perform a first channel estimation with regard to a first channel between a first transmit antenna and a first receive antenna, a second channel estimation with regard to a second channel between the first transmit antenna and a second receive antenna, a third channel estimation with regard to a third channel between a second transmit antenna and the first receive antenna, and a fourth channel estimation with regard to a fourth channel between the second transmit antenna and the second receive antenna; and
a timing compensator configured to compensate for a sampling timing difference between a first sampling timing that is associated with the first transmit antenna and a second sampling timing that is associated with the second transmit antenna, the timing compensator being programmable to be selectively enabled or disabled based on a specified receiver operation mode, which is selected from a plurality of receiver operation modes, in accordance with which the receiver system is to operate.

7. The receiver system of claim 6, wherein the timing compensator is configured to be enabled in response to the specified receiver operation mode including at least one of a multi-point high-speed downlink packet access (MP-HS-DPA) mode or a Type3I mode; and
wherein the timing compensator is configured to be disabled in response to the specified receiver operation mode including at least one of a Type3I mode, a Type3 mode, a multiple-input/multiple-output (MIMO) mode, or a space time transmit diversity (STTD) mode.

8. The receiver system of claim 6, wherein the timing compensator is configured to compensate for the sampling timing difference using at least one of the first channel estimation, the second channel estimation, the third channel estimation, or the fourth channel estimation.

9. The receiver system of claim 6, further comprising at least one of:
a converter block configured to convert radio frequency signals received from the first transmit antenna and the second transmit antenna via the first receive antenna to a first baseband signal, the converter block being further configured to convert the radio frequency signals received via the second receive antenna to a second baseband signal; or
a signal controller that includes:
a delay locked loop configured to reduce timing drift associated with the first baseband signal and to reduce timing drift associated with the second baseband signal, and
a down-sampling controller configured to reduce an oversampling rate associated with the first baseband signal and the second baseband signal to provide a first two-times chip-rate sampling frequency representation of the first baseband signal and a second two-times chip-rate sampling frequency representation of the second baseband signal.

10. The receiver system of claim 9, further comprising at least one of:
a delay matched module block configured to delay the first two-times chip-rate sampling frequency representation to compensate for a first delay associated with the first channel estimation to provide a first time adjusted signal, the delay matched module block being further configured to delay the second two-times chip-rate sampling frequency representation to compensate for a second delay associated with the second channel estimation to provide a second time adjusted signal; or
an equalizer configured to process the first two-times chip-rate sampling frequency representation and the second two-times chip-rate sampling frequency representation using the first channel estimation, the second channel estimation, the third channel estimation, and the fourth channel estimation to provide an output signal.

11. A method performed by a receiver system that is configurable to operate in accordance with each of a plurality of receiver operation modes, the method, comprising:
performing a first channel estimation operation to determine a first channel estimation with regard to a first channel between a first transmit antenna and a first receive antenna and a second channel estimation operation to determine a second channel estimation with regard to a second channel between the first transmit antenna and a second receive antenna; and
selectively compensating using none or more of a plurality of operations to be performed based on a specified receiver operation mode of the plurality of receiver operation modes in accordance with which the receiver system is configured to operate, the plurality of operations including:
compensating for a frequency offset that is equal to a difference between a first carrier frequency associated with the first transmit antenna and a second carrier frequency associated with a second transmit antenna by adjusting at least one of a phase associated with a third channel estimation regarding a third channel between the second transmit antenna and the first receive antenna or a phase associated with a fourth channel estimation regarding a fourth channel between the second transmit antenna and the second receive antenna.

12. The method of claim 11,
wherein the plurality of operations further includes:
performing a third channel estimation operation to determine the third channel estimation and a fourth channel estimation operation to determine the fourth channel estimation; and
determining the frequency offset;
wherein the plurality of receiver operation modes includes a multi-point high-speed downlink packet access (MP-HSDPA) mode, a Type3I mode, a multiple-input/multiple-output (MIMO) mode, and a space time transmit diversity (STTD) mode.

13. The method of claim 11, further comprising:
converting radio frequency signals received from the first transmit antenna and the second transmit antenna via the first receive antenna to a first baseband signal;
converting the radio frequency signals received via the second receive antenna to a second baseband signal;
reducing timing drift associated with the first baseband signal; and
reducing timing drift associated with the second baseband signal.

14. The method of claim 13, further comprising at least one of:
reducing an oversampling rate associated with the first baseband signal and the second baseband signal to provide a first two-times chip-rate sampling frequency representation of the first baseband signal and a second two-times chip-rate sampling frequency representation of the second baseband signal; or
processing the first two-times chip-rate sampling frequency representation and the second two-times chip-rate sampling frequency representation using at least the first channel estimation and the second channel estimation to provide an output signal.

15. The method of claim 14, wherein processing the first two-times chip-rate sampling frequency representation and the second two-times chip-rate sampling frequency representation comprises:
processing the first two-times chip-rate sampling frequency representation and the second two-times chip-rate sampling frequency representation further using the third channel estimation and the fourth channel estimation to provide the output signal.

16. The method of claim 11, the plurality of operations including:
compensating for a sampling timing difference between a first sampling timing that is associated with the first transmit antenna and a second sampling timing that is associated with the second transmit antenna.

17. The method of claim 16,
wherein the plurality of receiver operation modes includes a multi-point high-speed downlink packet access (MP-HSDPA) mode, a Type3I mode, a multiple-input/multiple-output (MIMO) mode, and a space time transmit diversity (STTD) mode.

18. The method of claim 16, further comprising:
converting radio frequency signals received from the first transmit antenna and the second transmit antenna via the first receive antenna to a first baseband signal;
converting the radio frequency signals received via the second receive antenna to a second baseband signal;
reducing timing drift associated with the first baseband signal; and
reducing timing drift associated with the second baseband signal.

19. The method of claim 18, further comprising at least one of:
reducing an oversampling rate associated with the first baseband signal and the second baseband signal to provide a first two-times chip-rate sampling frequency representation of the first baseband signal and a second two-times chip-rate sampling frequency representation of the second baseband signal; or
processing the first two-times chip-rate sampling frequency representation and the second two-times chip-rate sampling frequency representation using at least the first channel estimation and the second channel estimation to provide an output signal.

20. The method of claim 19, wherein processing the first two-times chip-rate sampling frequency representation and the second two-times chip-rate sampling frequency representation comprises:
processing the first two-times chip-rate sampling frequency representation and the second two-times chip-rate sampling frequency representation further using a third channel estimation regarding a third channel between the second transmit antenna and the first receive antenna or a phase associated with a fourth channel estimation regarding a fourth channel between the second transmit antenna and the second receive antenna to provide the output signal.

* * * * *